(No Model.)
F. A. GARDNER.
HOISTING AND WINDING DRUM.
No. 253,525. Patented Feb. 14, 1882.
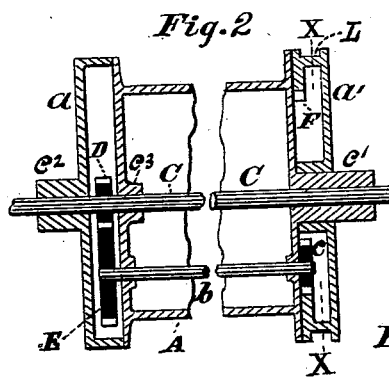
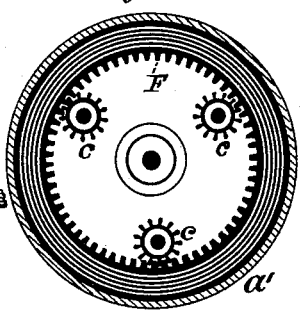
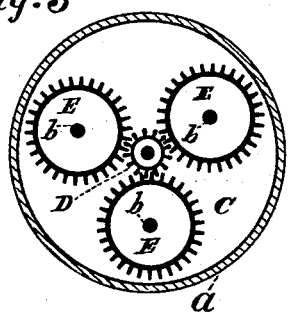
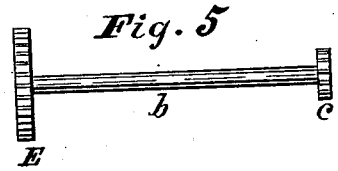
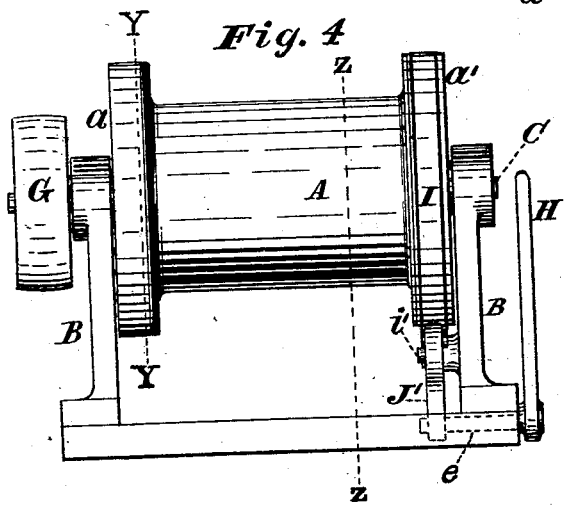
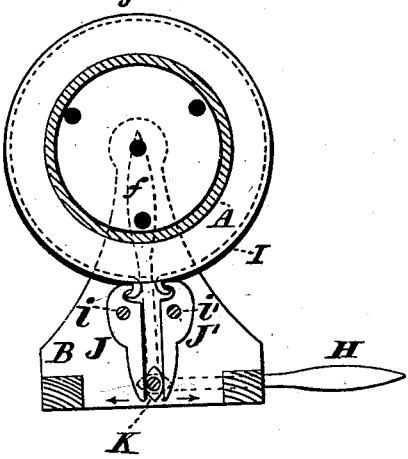
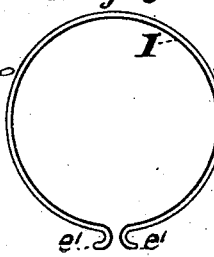
Witnesses.
Emory Cummings
Hugh Sangster
Inventor,
Frederick A. Gardner
By James Sangster
Atty.

UNITED STATES PATENT OFFICE.

FREDERICK A. GARDNER, OF BUFFALO, NEW YORK, ASSIGNOR TO HIMSELF AND R. DUNBAR & SON, OF SAME PLACE.

HOISTING AND WINDING DRUM.

SPECIFICATION forming part of Letters Patent No. 253,525, dated February 14, 1882.

Application filed November 14, 1881. (No model.)

*To all whom it may concern:*

Be it known that I, FREDERICK A. GARDNER, a subject of the Queen of Great Britain, residing in Buffalo, in the county of Erie and State of New York, have invented certain new and useful Improvements in Hoisting or Winding Drums, of which the following is a specification.

My invention relates to certain improvements in the mechanism and gearing for operating a winding-drum, all of which will be more clearly hereinafter shown and described by reference to the accompanying drawings, in which—

Figure 1 is a section through the drum-head. Fig. 2 is a central longitudinal section through the drum-heads and through the end portions of the winding-drum. Fig. 3 is a section through Y Y, Fig. 4. Fig. 4 represents a side elevation of the hoisting or winding drum complete. Fig. 5 is a side elevation of a portion of the gearing and shaft. Fig. 6 is a section through line Z Z, Fig. 4; and Fig. 7 is a detached front view of the friction-brake or a portion of the same.

The drum A is composed of the parts A and heads $a$ $a'$, all of which are fitted so as to turn easily on the central shaft C, and the whole is supported in a cast-iron frame, B. The shaft C is provided with a pinion, D, which gears into the wheels E, which gearing is arranged in the drum-head $a$. (See Figs. 2 and 4.) The wheels E are connected to a shaft, $b$, having its bearings at each end of the drum, (see Fig. 2,) and a pinion, $c$, is connected to the opposite end of the shaft. There are three of such shafts, wheels, and pinions. The pinions $c$ gear into the gearing F in the drum-head $a'$. (See Fig. 1.) The driving-wheel G is keyed or otherwise secured to the shaft C. One side of the drum A is provided with a hub, $c'$, upon which the head $a'$ is fitted and turns, and the head $a$ is also provided with a hub, $c^2$. The shaft C passes through the hub $c'$, then through the end $c^3$ of the drum A, and through the hub $c^2$, so that the whole turns on the said shaft. The hubs $c'$ $c^2$ are fitted in bearings in the frame B. It will now be seen that when the driving-wheel is turned the pinion D moves the wheels E, which in turn move the pinions $c$, which transmit their movement to the gearing F, and thereby give the necessary movement to the drum, when the head $a'$ is held stationary by the brake; and when the brake is open, so that the head $a'$ is loose, the drum will remain stationary.

The braking device consists of a thin metallic strip or ring, I, (shown in Fig. 7, also in Figs. 4 and 6,) which ring is fitted in the groove L of the head $a'$, (see Figs. 2 and 4,) and is provided with two hook-shaped ends, $e'$, at the bottom, into which the hooked ends of the jaws J J' engage, (see Fig. 6,) said jaws being kept in place by the pins $i$ $i'$, on which they swing or turn easily. The lower ends of said jaws are made long enough to give the required leverage and form two arms, between which the piece K is arranged, and either forms a part of or is rigidly fastened to a shaft, $e$, (shown by dotted lines in Fig. 4,) which shaft is secured in a bearing in the frame B, so as to turn easily therein. Its opposite end is provided with a handle, H. (See Figs. 4 and 6.) It will now appear from this arrangement that when the arm H is in the position shown in Fig. 4 and by the dotted lines $f$ in Fig. 6 the brake or ring I (which is made to spring outward and is kept to its place by the jaws J J') will spring open, so as to fit loosely in the groove L, as the piece K has its narrowest portion between the lower ends of the jaws, and allows them to be forced nearer together by the outward springing of the ring I, which forces the upper hooked portions apart. When the arm H is turned down, as shown in Fig. 6, the action of the jaws is reversed, and the brake is tightened, and the head $a'$ is held stationary, so that the drum A is turned by the action of the driving-wheel G.

This device is well adapted for hoisting freight or for other similar purposes, and is provided with the usual rope for that purpose, or with a cable or a chain, which is connected to the winding-drum in any well-known way. By its means a heavy weight may be drawn up, or held stationary at any point, or let down easily when required.

I claim as my invention—

1. In a hoisting or winding drum, the hollow head $a$, having the gearing D and E, in combination with the shafts $b$, winding-drum A, and hollow head $a'$ at the opposite end, having the gearing $c$ F and their operating mechanism, substantially as and for the purposes specified.

2. A winding or hoisting drum composed of the parts $a$ A $a'$, and provided with the driving-shaft, pulley, and gearing, substantially as specified, in combination with a brake, I, and its connecting and operating parts, substantially as described.

FREDERICK A. GARDNER.

Witnesses:
  AMOS W. SANGSTER,
  F. N. SIMONDS.